UNITED STATES PATENT OFFICE.

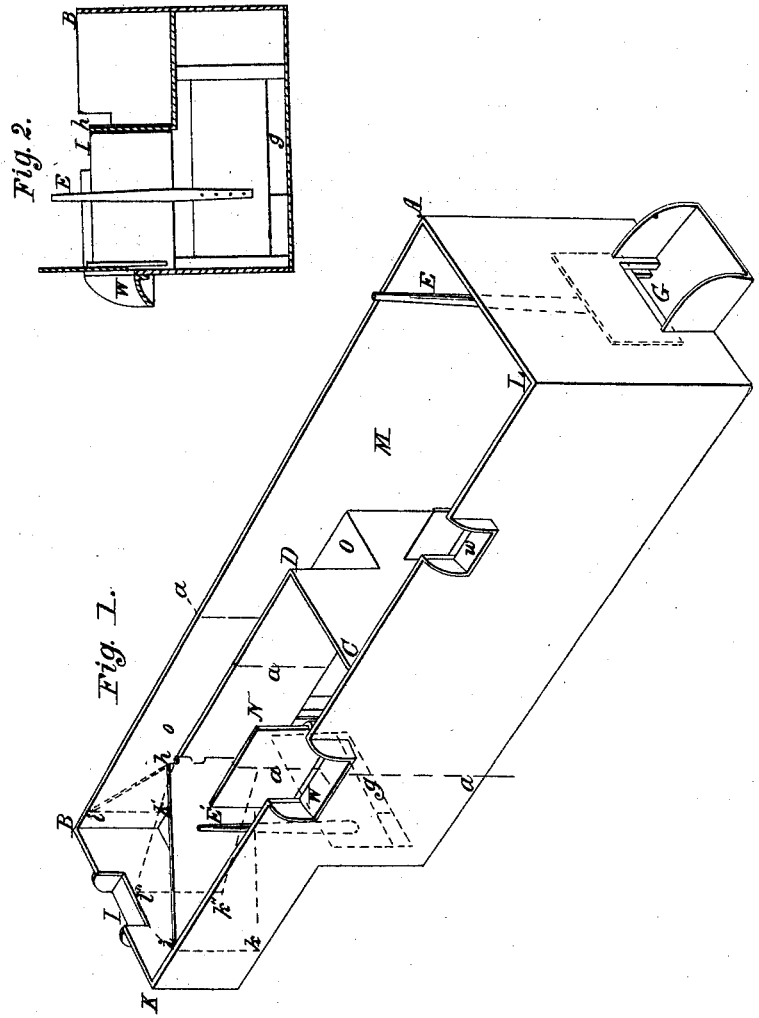

HENRY MALLOW, OF UPPER TRACT, VIRGINIA.

REGULATING FOREBAYS.

Specification of Letters Patent No. 6,172, dated March 13, 1849.

*To all whom it may concern:*

Be it known that I, HENRY MALLOW, of Upper Tract, in the county of Pendleton and State of Virginia, have invented a new and useful Forebay - Regulator; and I do hereby declare that the following is a full, clear, and exact description thereof, reference being had to the accompanying drawings, in which—

Figure 1 is a perspective view and Fig. 2 a transverse section through the plane $a\,a\,a\,a$ of Fig. 1.

The nature of my invention is such as to regulate the flow of water to two or more water wheels receiving their water from the same forebay. And as it is very important that for certain purposes for which water wheels are used, their supply of water should be constant, while, for other purposes considerable variations in the quantity of water may not cause any serious detriment to the work performed, my forebay regulator is intended to allow one or more wheels requiring an unvarying amount of power to be exerted, to be driven by water from the same forebay, which also supplies one or more wheels, having variable work to perform, and which are occasionally stopped altogether.

The means by which I regulate the flow of water from the forebay to the respective wheels consist of a partition $C\,D\,h$ which has its upper edge lower than that of the forebay itself $A\,B\,K\,L$; of a swinging gate $h$, $i$, $k$, revolving about a hinge $p$, and of one or more waste gates or weirs $W$, $w$.

The notch I represents the head race or passage by which water arrives at the forebay.

G is an outlet gate by which water is allowed to pass from the compartment M of the forebay; O O is a passage by which it arrives at M when entering at I, and while the gate $h$, $i$, $k$, stands in the position represented by the plain lines as in Fig. 1. Should the quantity of water arriving through I, exceed the demand for the wheel or wheels to be supplied from the compartment M, the water will rise to, and a portion will flow over, the partition $C\,D\,h$ into the compartment N, from which it may be drawn by one or more gates $g$, either with steady or variable rates of flow, according to the requirements of the work. Should the quantity of water arriving through I be greater than is necessary for the wheels supplied both from M and N, the excess is discharged through the waste gate or weir W. By this arrangement whatever irregularities may exist in the height of water in N, the level in M is undisturbed.

When it is necessary that the wheels and machinery propelled by water drawn from N should be driven by an invariable amount of power, the swinging gate is made to revolve on the hinge $h$ from the position $h\,i\,k$ to $h\,i'\,k'$, in which latter position it will divert the whole amount of water arriving through I, first into the compartment N; and none will then arrive at the gate G until the level rises above $C\,D\,h$. This arrangement gives a steady action to the wheel propelled by water passing through $g$, and an unsteady one may be employed at the other wheels.

When both wheels or sets of wheels are required to run with equal steadiness and constancy the hinged wing-gate $h\,i\,k$, may be set so as to present its edge $i''\,k''$ opposite to the passage I, and should there be, in such case, an excess of water for all the mills, it may be discharged at the same time through duly regulated waste-gates W and $w$, in both compartments M, N, of the forebay, or through one alone as shall be found most convenient.

When more than two mills are to have steady supplies of water furnished at the same time under different heads the regulation will be effected in the same manner as above described, only that two or more partitions of different heights, acting in the same manner as $C\,D\,k$, will then separate distinct compartments, which may successively receive the surplus water passing from one to another, and the mill or mills not requiring a steady supply, will be actuated by water from the last receptacle into which it passes, over the lowest partition.

What I claim as my invention and desire to secure by Letters Patent is—

1. The method of regulating the supply of water from one and the same forebay, to different water wheels, or other movers of machinery driven by water, by means of a partition or partitions, over which water not required for the steady action of one wheel or series of wheels, may pass to one or more other wheels which do not require constant and invariable supplies, in the manner and for the purposes herein set forth.

2. I also claim the use of the above manner of regulating the water of a forebay by partitions, in combination with one or more swinging gates attached to said partitions, so adjustable as to regulate, change or reverse the course of the currents of water, and also in combination with the regulating waste gates, herein described, acting in the manner and for the purposes herein set forth.

HENRY MALLOW.

Witnesses:
　WALTER R. JOHNSON,
　Z. C. ROBBINS.